Patented Mar. 25, 1924.

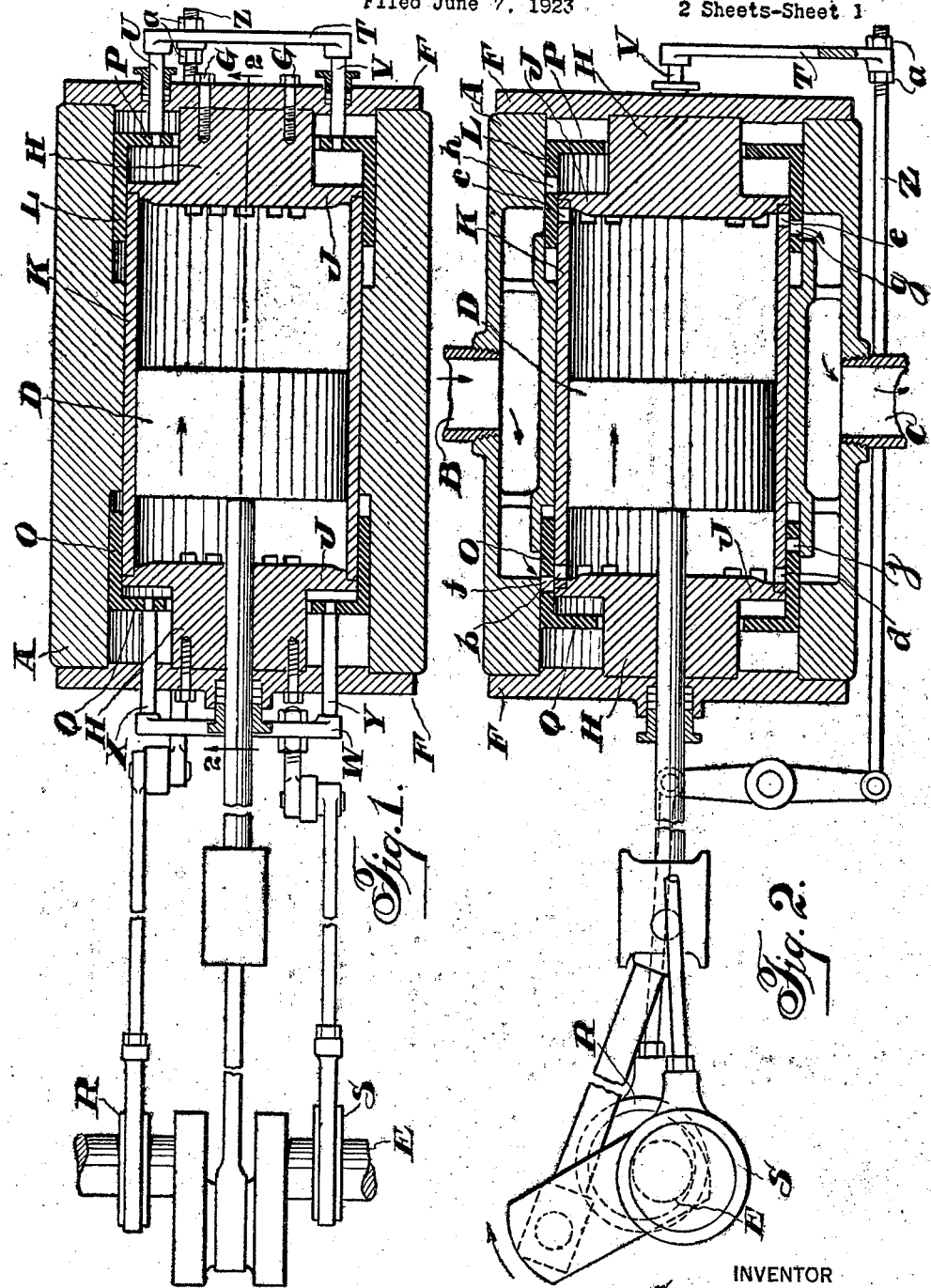

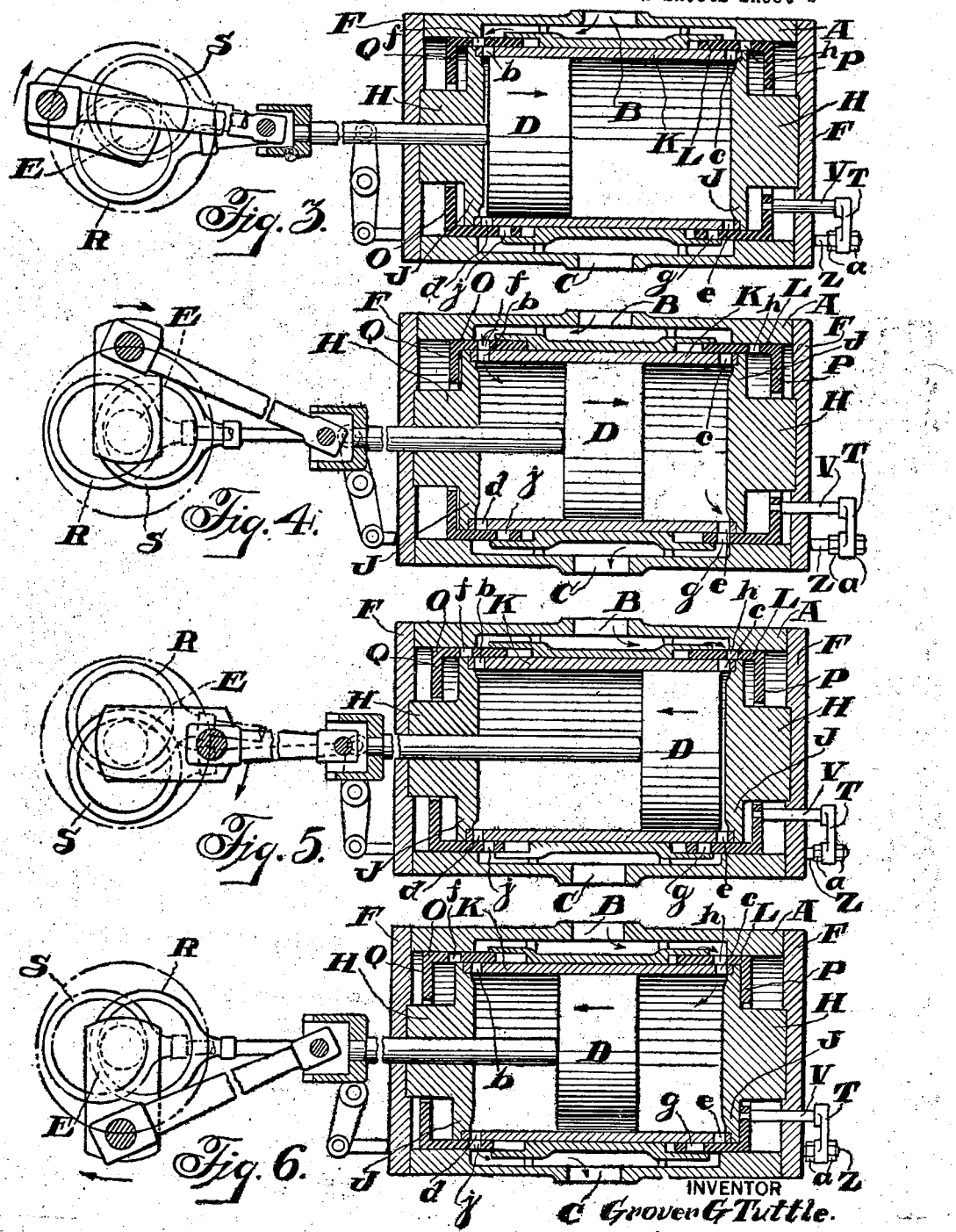

1,487,770

UNITED STATES PATENT OFFICE.

GROVER G. TUTTLE, OF PHILLIPSBURG, NEW JERSEY, ASSIGNOR TO INGERSOLL-RAND COMPANY, OF JERSEY CITY, NEW JERSEY, A CORPORATION OF NEW JERSEY.

PISTON VALVE FOR COMPRESSORS.

Application filed June 7, 1923. Serial No. 643,823.

*To all whom it may concern:*

Be it known that I, GROVER G. TUTTLE, a citizen of the United States, and a resident of Phillipsburg, county of Warren, and State of New Jersey, have invented a certain Piston Valve for Compressors, of which the following is a specification accompanied by drawings.

This invention relates to compressors, but more particularly to a valve for controlling the inlet and discharge of the compressor cylinder.

One of the main objects of the invention is to produce a bushing which may be removed from a compressor cylinder, and which serves as a bearing for the compressor piston.

Another object of the invention is to enable the inlet and discharge of the compressor cylinder, to be controlled by a sleeve valve lying wholly within the compressor cylinder and having ports adapted to be brought into registration with corresponding ports in the bushing.

Further objects of the invention will hereinafter appear and the invention is shown in one of its preferred forms in the drawings, in which—

Figure 1 is a top plan view partly in horizontal section of so much of a compressor valve and valve gear, as will serve to illustrate the invention.

Figure 2 is a side elevation partly in vertical section of the compressor shown in Figure 1, and Figures 3, 4 5 and 6 are diagrammatic views partly in vertical section, showing the relative positions of the piston and valves in the different positions of the piston stroke.

Referring to the drawings, the compressor cylinder A having the intake B and discharge C, is provided with the reciprocating piston D driven in any suitable manner from the crank shaft E. The ends of the cylinder A are closed by the heads F, to which the blocks H are secured in any suitable manner, as by the bolts G. The blocks H are formed with the enlarged heads J of slightly less diameter than the inner diameter of the cylinder A.

In accordance with the present invention, a sleeve or bushing K is pressed into the cylinder A by hydraulic pressure or any other suitable means, and forms a bearing for the piston D. The bushing K may be renewed whenever necessary as wear takes place. Located between the bushing K and the cylinder A are the sleeve valves L and O having their outer ends formed with inwardly extending flanges P and Q respectively, for controlling the inlet and discharge of the cylinder. The flanges P and Q cooperate with the enlarged heads J of the blocks H to prevent excessive pressure from being exerted on the ends of the valves L and O. Any pressure fluid in the space between the enlarged heads J and the heads F will be churned back and forth in the movement of the flanged heads P and Q, and thus prevent a greater amount of pressure fluid on one end of the flange than on the other end.

Any suitable operative devices and mechanism as the eccentrics S and R, may be provided for mechanically actuating the valves L and O. In this instance, the eccentric strap R is pivotally connected to the yoke T to which the valve rods U and V are connected for actuating the sleeve valve L. The eccentric S is connected to the yoke W to which the valve rods X and Y are connected for actuating the sleeve valve O. Any suitable means may be provided for adjusting the valves L and O relatively to each other and in this instance, the yoke T is shown adjustably connected to the rod Z by the nuts *a*. By actuating the yoke T inwardly or outwardly on the rod Z the sleeve valves L and O may be brought toward each other or away from each other, as desired for different ratios of compression.

In the operation of the machine, the sleeve valves L and O control the inlet and discharge of the cylinder, and pressure fluid is admitted to the cylinder through the ports *b* and *c* and discharged through the ports *d* and *e* in the bushing K. The eccentrics R and S are set at such an angle and in proper relation with the piston rod crank, that the required timing of the sleeve valves is obtained.

In Figure 3 the piston D is shown moving to the right from the extreme left of its movement in the cylinder A and pressure fluid is about to be admitted into the cylinder through the port *f* in the valve O, and the port *b* in the bushing K, and discharged through the port *e* in the bushing K and port *g* in the valve L. Figure 4 shows the position of the parts after the piston has moved a slight distance to the right and the inlet ports $f$ and $b$ have registered and the discharge ports $g$ and $e$ have registered, and pressure fluid is discharged through the discharge line C.

In Figure 5 the piston D is shown in its extreme right hand position in the cylinder A and starting to move toward the left of the cylinder. The inlet port $h$ in the sleeve valve L is about to uncover the inlet port $c$ in the bushing K and the discharge port $d$ in the bushing K is about to uncover the discharge port $j$ in the valve O.

In Figure 6 the piston D has moved slightly to the left, and the inlet ports $h$ and $c$ are in registration, and pressure fluid is admitted to the cylinder, and the discharge ports $d$ and $j$ are in registration and pressure fluid is being discharged into the discharge line C. This cycle of operations will continue as the piston D reciprocates, the sleeve valves L and O alternately controlling the inlet and discharge of the cylinder.

I claim:

1. In a compressor, the combination with a cylinder and reciprocating piston of a plurality of mechanically operated sleeve valves located wholly within the cylinder adapted to control the inlet and discharge of the cylinder, and a renewable bushing having ports adapted to register at intervals with ports in the said valves, said bushing located within the cylinder and forming a bearing for the piston.

2. In a compressor, the combination with a cylinder and reciprocating piston of a plurality of mechanically operated valves located wholly within the cylinder adapted to control the inlet and discharge of the cylinder, heads closing the ends of the cylinder, blocks having enlarged heads connected to the said heads, and a renewable bushing located within the cylinder and forming a bearing for the piston.

3. In a compressor, the combination with a cylinder and reciprocating piston, of a mechanically operated valve located wholly within the cylinder adapted to control the inlet and discharge of the cylinder, heads closing the ends of the cylinder, blocks having enlarged heads connected to the said heads, and a renewable bushing having ports adapted to register at intervals with ports in the valves, said bushing located within the cylinder and forming a bearing for the piston.

In testimony whereof I have signed this specification.

GROVER G. TUTTLE.